(12) United States Patent
Mathur et al.

(10) Patent No.: US 12,639,973 B1
(45) Date of Patent: May 26, 2026

(54) SYSTEMS AND METHODS FOR NATURAL LANGUAGE PROCESSING DOCUMENTATION REVIEW SYSTEM FOR CLINICAL DECISION SUPPORT

(71) Applicant: Elevance Health, Inc., Indianapolis, IN (US)

(72) Inventors: Ayush Mathur, Novi, MI (US); Pice Chen, Indianapolis, IN (US); Hong Ni, Indianapolis, IN (US); Chao Zhang, Indianapolis, IN (US); James D. Martindale, Indianapolis, IN (US); Harsha Arcot, Indianapolis, IN (US); Madeline Glasheen, Indianapolis, IN (US); Summer McDonald, Indianapolis, IN (US); Stephanie English, Indianapolis, IN (US)

(73) Assignee: Elevance Health, Inc., Indianapolis, IN (US)

( * ) Notice: Subject to any disclaimer, the term of this patent is extended or adjusted under 35 U.S.C. 154(b) by 390 days.

(21) Appl. No.: 18/168,408

(22) Filed: Feb. 13, 2023

Related U.S. Application Data

(60) Provisional application No. 63/267,925, filed on Feb. 12, 2022.

(51) Int. Cl.
*G06V 30/42* (2022.01)
*G06F 40/166* (2020.01)
(Continued)

(52) U.S. Cl.
CPC ............ *G06V 30/42* (2022.01); *G06F 40/166* (2020.01); *G06F 40/295* (2020.01); *G06V 10/82* (2022.01);
(Continued)

(58) Field of Classification Search
CPC .............. G06V 30/42; G06V 30/1475; G06V 30/19173; G06V 10/82; G06F 40/166; G06F 40/295; G16H 10/00; G16H 15/00
See application file for complete search history.

(56) References Cited

U.S. PATENT DOCUMENTS

| | | | |
|---|---|---|---|
| 11,862,305 B1 * | 1/2024 | Sethi ...................... | G06N 20/00 |
| 2018/0006979 A1 * | 1/2018 | Barsness ................. | H04L 51/52 |
| 2022/0156488 A1 * | 5/2022 | Mokhtari .............. | G06F 40/284 |

OTHER PUBLICATIONS

Li, et al. (Building Structured Personal Health Records from Photographs of Printed Medical Records),pp. 1-10. (Year: 2016).*
(Continued)

*Primary Examiner* — Daniel G Mariam
(74) *Attorney, Agent, or Firm* — Morgan, Lewis & Bockius LLP

(57) ABSTRACT

A computer-implemented method for digitizing clinical documents comprises receiving a clinical document and a policy type. The method further comprises de-skewing and removing noise from the page. The method further comprises generating extracted text from the processed page using OCR, analyzing the extracted text to generate a classification label for the page using a multinomial classifier model comprising an LSTM neural network, which has been trained to recognize different classes of page based on similarities to a corpus of historical pages that have been previously classified. The method further comprises recognizing a specified keyword within the extracted text, using an NER that is trained using policy data relating to a policy having the policy type, and displaying a visual representation of the clinical document with a visual indicator of the presence of the specified keyword on the page, and a visual indicator of the classification label.

20 Claims, 3 Drawing Sheets

(51) Int. Cl.
    *G06F 40/295*        (2020.01)
    *G06V 10/82*         (2022.01)
    *G06V 30/146*      (2022.01)
    *G06V 30/19*        (2022.01)

(52) U.S. Cl.
    CPC .... *G06V 30/1475* (2022.01); *G06V 30/19173*
                                  (2022.01)

(56)                   References Cited

OTHER PUBLICATIONS

Hindu, et al. (Swift Medical Report Analysis using Computer Vision (SMRA-CV), pp. 3163-3178. (Year: 2021).*

* cited by examiner

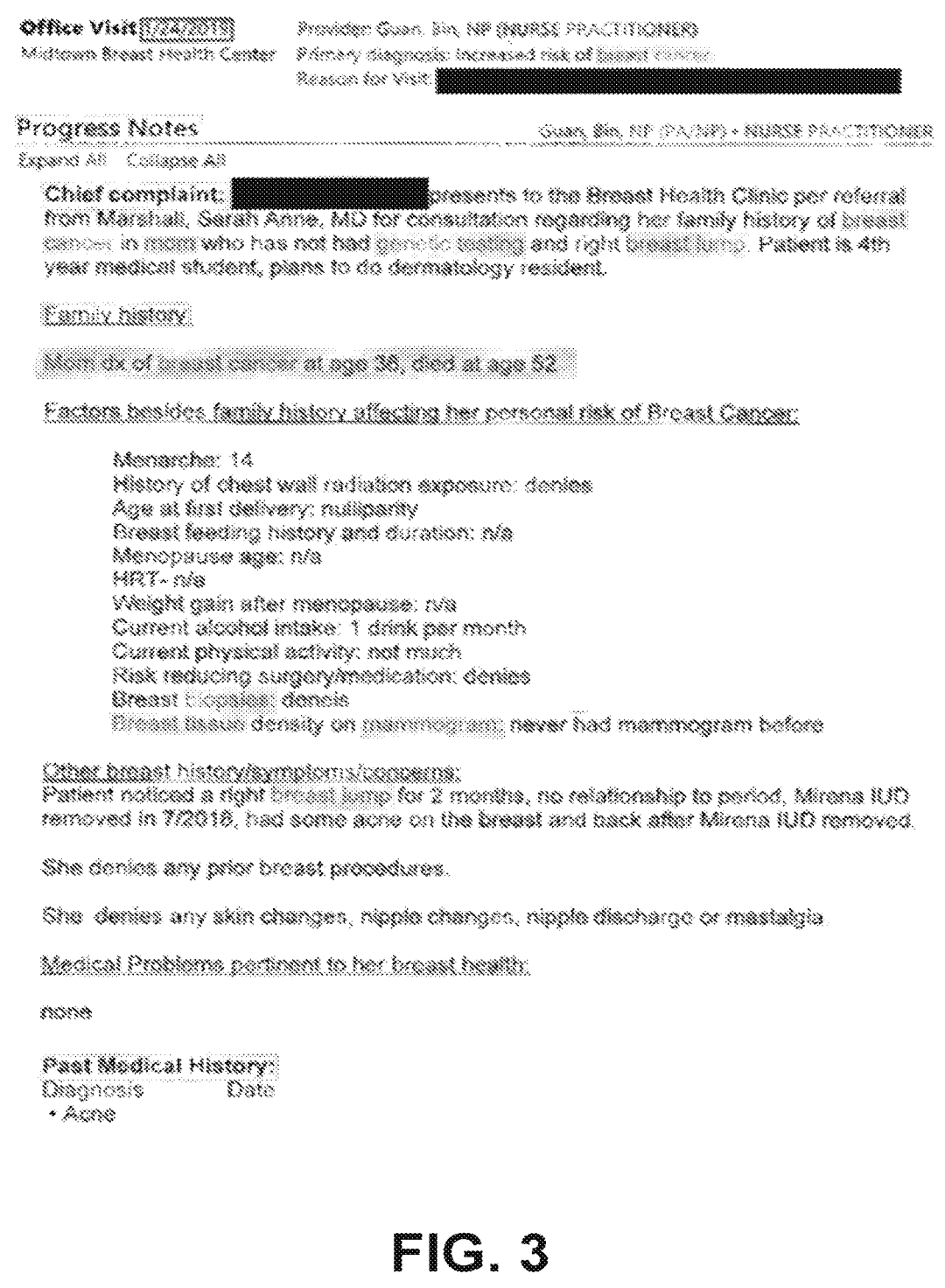

Office Visit ▓▓▓▓    Provider: Guan, Jin, NP (NURSE PRACTITIONER)
Midtown Breast Health Center    Primary diagnosis: increased risk of ▓▓▓▓
                           Reason for Visit: ████████████████

Progress Notes
                                 Guan, Jin, NP (PA/NP) - NURSE PRACTITIONER
Expand All   Collapse All

Chief complaint: ████████████ presents to the Breast Health Clinic per referral from Marshall, Sarah Anne, MD for consultation regarding her family history of breast cancer in mom who has not had genetic testing and right breast lump. Patient is 4th year medical student, plans to do dermatology resident.

Family history

Mom dx of breast cancer at age 38, died at age 52

Factors besides family history affecting her personal risk of Breast Cancer:

Menarche: 14
       History of chest wall radiation exposure: denies
       Age at first delivery: nulliparity
       Breast feeding history and duration: n/a
       Menopause age: n/a
       HRT~ n/a
       Weight gain after menopause: n/a
       Current alcohol intake: 1 drink per month
       Current physical activity: not much
       Risk reducing surgery/medication: denies
       Breast biopsies: denies
       Breast tissue density on mammogram: never had mammogram before Other breast history/symptoms/concerns:
Patient noticed a right breast lump for 2 months, no relationship to period, Mirena IUD removed in 7/2018, had some acne on the breast and back after Mirena IUD removed.

She denies any prior breast procedures.

She denies any skin changes, nipple changes, nipple discharge or mastalgia

Medical Problems pertinent to her breast health:

Past Medical History:
Diagnosis      Date
 • Acne

FIG. 3

SYSTEMS AND METHODS FOR NATURAL LANGUAGE PROCESSING DOCUMENTATION REVIEW SYSTEM FOR CLINICAL DECISION SUPPORT

CROSS REFERENCE TO RELATED APPLICATIONS

This application claims the benefit of U.S. Provisional Patent Application No. 63/267,925, filed Feb. 12, 2022, entitled "Systems and Method for Natural Language Processing Documentation Review System for Clinical Decision Support," the disclosure of which is incorporated by reference herein in its entirety.

TECHNICAL FIELD

The disclosed implementations relate generally to healthcare applications and more specifically to systems and methods for a natural language processing documentation review system for supporting clinical decisions.

BACKGROUND

In the United States, healthcare costs are increasing rapidly to historical rates. For insurers and other third-party healthcare payors, Utilization Management (UM) (the process to evaluate evidence that a procedure, drug, equipment, or other care-related expense is necessary given industry and health plan-accepted criteria and that the care is appropriate given the unique condition and history of the patient, so that payment for the care can be approved or denied, for example) is time-consuming and can take up to several weeks. If a medical practitioner denies the request, it may go to a physician for approval. The medical practitioner has to upload the denial or review the case and call the provider to tell them what is missing. UM takes the form of prior authorizations, pre-certifications, referrals, and appeals. Speed in this process is important not only to the efficiency of the third-party payors who handle many such claims, but also to the efficacy of the healthcare of the patient, for whom delays can cause changes in his or her medical status.

Historical challenges in delivering the efficiencies associated with this invention stem from the lack of meaningful use within the clinical settings driven by low-quality outputs from optical character recognition (OCR), lack of maturity from the natural language processing (NLP) artificial intelligence (AI) models, and a lack of integration within appropriate business/clinical workflows and systems. These challenges were exemplified given the complex, clinical nature of the source documentation in question-rich in complex and non-standard terms, clinical shorthand, rich data, and written artifacts. Leveraging improvements in OCR and NLP AI technology, a system that meaningfully addresses the challenges in scope can now be achieved.

Internally within health payors, UM processes are rooted in the delivery of a decision of whether the requested health service, equipment, or care for the specific patient is approved based on the aforementioned criteria. The UM process is a manual one, performed by clinical staff who carefully review the unique scenarios, clinical documentation received in support of the request, and the medical necessity criteria (defined by industry or health plan standards) to make the ultimate decision. The UM process includes the parallel review of clinical documentation and medical necessity criteria, as subjective clinical evidence must be found and documented to support every respective medical necessity criteria present in the standards leveraged.

Much of the delay in the current state of the art in UM processes stems from the inability to effectively digitize patient medical files and other evidence related to the coverage decision. Evidence for consideration in an approval decision can contain many different kinds of documents, which may include prose, tables, images, and lists. More effective digitization of evidence documents could speed the review of the documents by the professionals tasked with reviewing them, as documents that are in searchable electronic form can be categorized automatically, and different categories of documents can then be reviewed by different types of professionals, e.g., in parallel, each of whom is more able than before to search for important information in the documents, including key terms relevant to the scope of their review.

SUMMARY

Accordingly, there is a need for systems and methods to drive efficiencies in the ongoing review of clinical documentation in order to make a justified clinical decision.

This invention is intended to drive efficiencies in the ongoing, manual review of clinical documentation in support of adjudicating clinical decisions. By establishing a system encompassing OCR functionality for all incoming clinical documentation or evidence and advanced NLP algorithms, this invention provides outputs to clinicians that are meaningful and more efficiently drive the clinical adjudication process. These outputs include highlighting clinical documentation elements and extractive summaries of the documentation that are directly related to the respective scope/decision at hand in addition to providing functionality such as copy/pasting and voice to text.

In another aspect, a system configured to perform any of the above methods is provided, according to some implementations.

In one aspect of the invention, a computer-implemented method for digitizing clinical documents is disclosed. The method comprises receiving a clinical document and a policy type relating to the clinical document, the clinical document comprising at least one page, generating a processed page, by detecting whether the page includes an orientation skew, de-skewing the page, detecting whether the page includes noise, and removing noise from the page. The method comprises generating extracted text from the processed page using OCR, analyzing the extracted text to generate a classification label for the page using a multinomial classifier model comprising a long short-term memory (LSTM) neural network, wherein the multinomial classifier model has been trained to recognize different classes of page, based on similarities to a corpus of historical pages that have been previously classified, recognizing a specified keyword within the extracted text, using a named entity recognition model (NER), wherein the NER is trained using policy data relating to a policy having the policy type, and wherein the specified keyword is identified as relating to the policy type, and displaying a visual representation of the clinical document on a display, wherein the visual representation comprises a visual indicator of the presence of the specified keyword on the page, and a visual indicator of the classification label.

In some aspects of the invention, the method further comprises correcting grammatical and textual abnormalities in the extracted text using a rules-based approach. In some aspects of the invention, the method further comprises classifying an image on the page, using a convolutional neural network (CNN) architecture, wherein the CNN architecture is trained based on similarities to a corpus of historical pages that have been previously classified as comprising an image. In some aspects of the invention, the method further comprises analyzing an image and text on the processed page to classify the processed page, using the CNN architecture to classify the image and the LSTM to classify the text. In some aspects of the invention, the de-skewing step and the removing-noise step are performed using an OpenCV library. In some aspects of the invention, the method further comprises the step of correcting a spelling of a word in the extracted text by choosing a corrected word, based at least in part on the frequency with which the corrected word appears in at least one of the corpus of historical pages and the policy data. In some aspects of the invention, the method further comprises analyzing the extracted text to determine a location of a header, wherein the multinomial classifier model uses the location of the header to generate the classification label.

In one aspect of the invention, a non-transitory computer-readable storage medium storing one or more programs for execution by one or more processors of an electronic device is disclosed. The one or more programs comprises instructions for receiving a clinical document and a policy type relating to the clinical document, the clinical document comprising at least one page, generating a processed page, by detecting whether the page includes an orientation skew, de-skewing the page, detecting whether the page includes noise, and removing noise from the page. The one or more programs further comprises instructions for generating extracted text from the processed page using OCR, analyzing the extracted text to generate a classification label for the page using a multinomial classifier model comprising an LSTM neural network, wherein the multinomial classifier model has been trained to recognize different classes of page, based on similarities to a corpus of historical pages that have been previously classified, recognizing a specified keyword within the extracted text, using an NER model, wherein the NER is trained using policy data relating to a policy having the policy type, and wherein the specified keyword is identified as relating to the policy type, and displaying a visual representation of the clinical document on a display, wherein the visual representation comprises a visual indicator of the presence of the specified keyword on the page, and a visual indicator of the classification label.

In one aspect of the invention, the medium further comprises instructions for correcting grammatical and textual abnormalities in the extracted text using a rules-based approach. In one aspect of the invention, the medium further comprises instructions for classifying an image on the page, using a CNN architecture, wherein the CNN architecture is trained based on similarities to a corpus of historical pages that have been previously classified as comprising an image. In one aspect of the invention, the medium further comprises instructions for analyzing an image and text on the processed page to classify the processed page, using the CNN architecture to classify the image and the LSTM to classify the text. In one aspect of the invention, the de-skewing step and the removing noise step are performed using an OpenCV library. In one aspect of the invention, the medium further comprises instructions for correcting a spelling of a word in the extracted text by choosing a corrected word, based at least in part on the frequency with which the corrected word appears in at least one of the corpus of historical pages and the policy data. In one aspect of the invention, the medium further comprises instructions for analyzing the extracted text to determine a location of a header, wherein the multinomial classifier model uses the location of the header to generate the classification label.

In one aspect of the invention, a system for automating clinical documentation review, the system comprises one or more processors, memory; and one or more programs stored in the memory. The one or more programs are configured for execution by the one or more processors and include instructions for receiving a clinical document and a policy type relating to the clinical document, the clinical document comprising at least one page, generating a processed page, by detecting whether the page includes an orientation skew, de-skewing the page. detecting whether the page includes noise; and removing noise from the page. The one or more programs further comprise instructions for generating extracted text from the processed page using OCR, analyzing the extracted text to generate a classification label for the page using a multinomial classifier model comprising an LSTM neural network, wherein the multinomial classifier model has been trained to recognize different classes of page, based on similarities to a corpus of historical pages that have been previously classified, recognizing a specified keyword within the extracted text, using an NER, wherein the NER is trained using policy data relating to a policy having the policy type, and wherein the specified keyword is identified as relating to the policy type, and displaying a visual representation of the clinical document on a display, wherein the visual representation comprises a visual indicator of the presence of the specified keyword on the page, and a visual indicator of the classification label.

In some aspects of the invention, the one or more programs further comprise instructions for correcting grammatical and textual abnormalities in the extracted text using a rules-based approach. In some aspects of the invention, the one or more programs further comprise instructions for classifying an image on the page, using a CNN architecture, wherein the CNN architecture is trained based on similarities to a corpus of historical pages that have been previously classified as comprising an image. In some aspects of the invention, the one or more programs further comprise instructions for analyzing an image and text on the processed page to classify the processed page, using the CNN architecture to classify the image and the LSTM to classify the text. In some aspects of the invention, the de-skewing step and the removing-noise step are performed using an OpenCV library. In some aspects of the invention, the one or more programs further comprise instructions for correcting a spelling of a word in the extracted text by choosing a corrected word, based at least in part on the frequency with which the corrected word appears in at least one of the corpus of historical pages and the policy data. In some aspects of the invention, the one or more programs further comprise instructions for analyzing the extracted text to determine a location of a header, wherein the multinomial classifier model uses the location of the header to generate the classification label.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 3 is an exemplar of a user interface for reviewing a medical record after it has been evaluated in accordance with some implementations.

DETAILED DESCRIPTION

Figure 1:
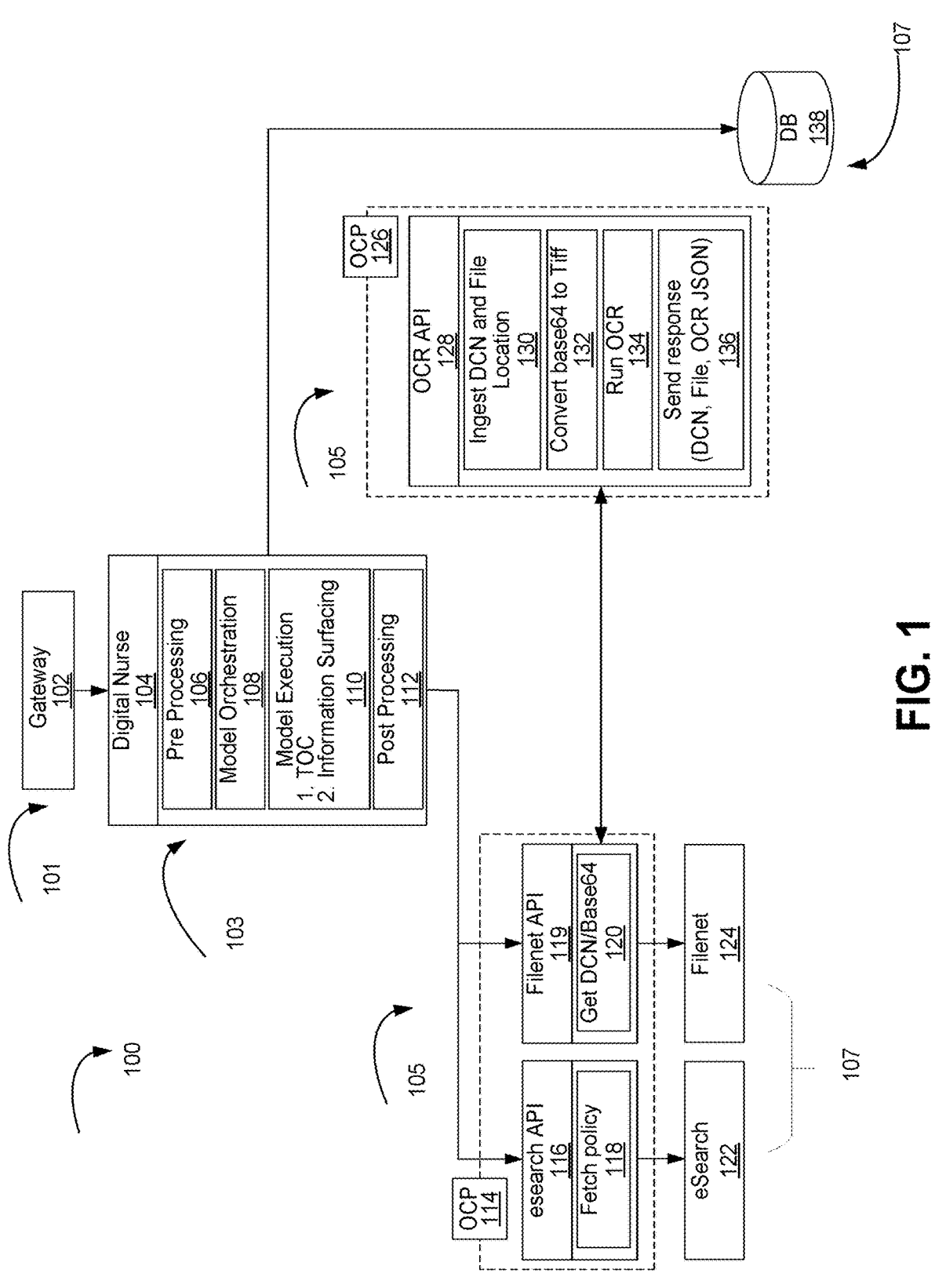
FIG. 1 is a schematic diagram for supporting clinical documentation review, according to some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms "first," "second," etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The present disclosure establishes a system encompassing improved OCR functionality for all incoming clinical documentation or evidence and advanced NLP algorithms. The invention provides outputs to clinicians that are meaningful and more efficiently drive the clinical decision processes. These outputs include highlighting clinical documentation elements and extractive summaries of the documentation that are directly related to the respective scope and decision at hand in addition to providing functionality such as copy/ pasting and voice to text. In driving efficiencies in the ongoing, manual review of clinical documentation, an advanced natural language processing system is provided herein that trains specific AI models.

Referring to FIG. 1, there is shown a schematic diagram for a system for supporting clinical documentation review, according to some implementations.

The system 100 includes a UM module 101, ECP platform module 103, API module 105, and data systems module 107.

The UM module 101 includes a client gateway module 102. The client gateway module 102 may receive one or more clinical documents, which may include medical records. Clinical documents may be received by gateway 102 via a manual upload by a human user, or they may be transferred to gateway 102 from another system. Clinical documents may be provided to digital nurse module 104 of ECP platform module 103.

Figure 2:
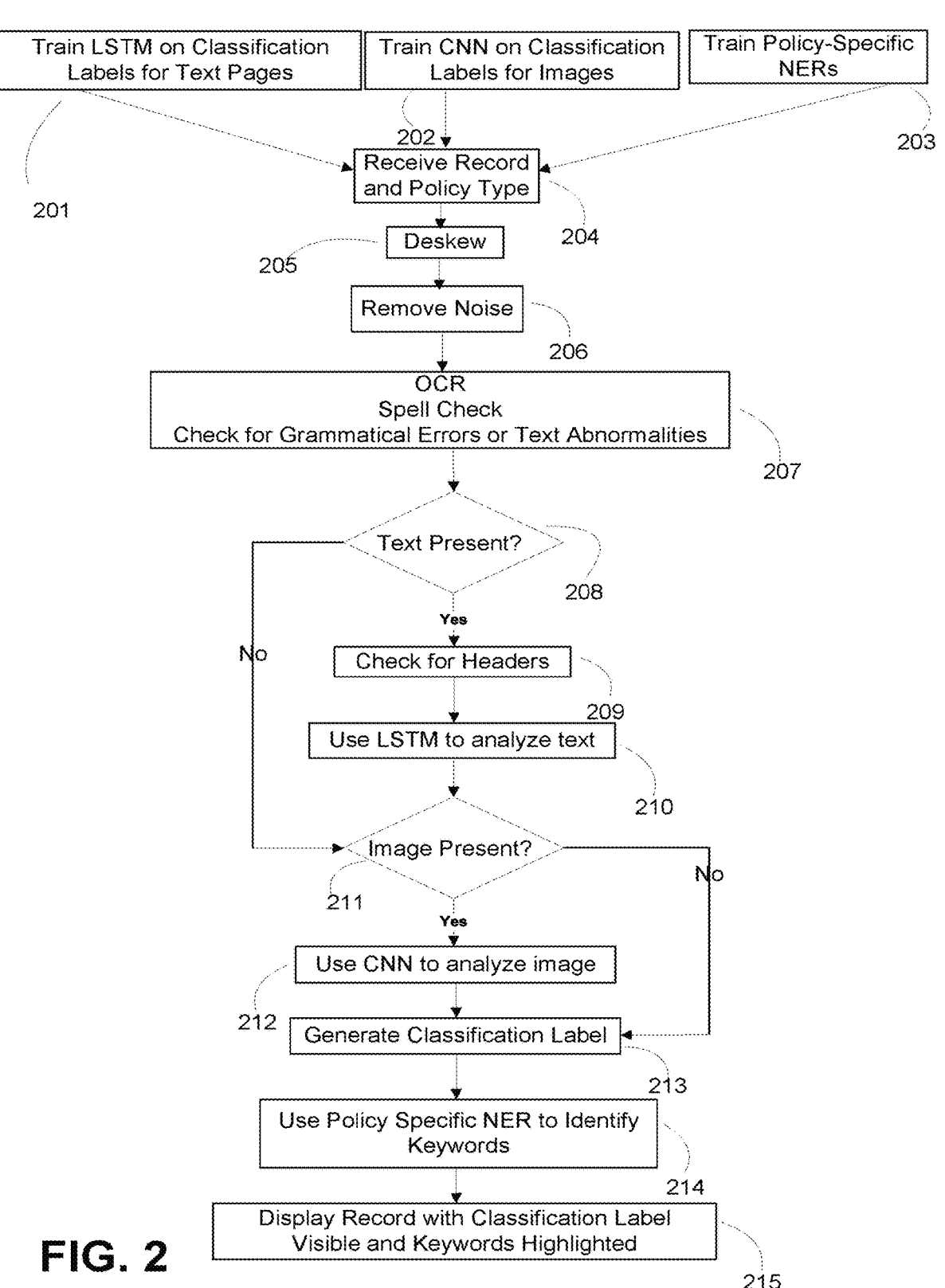
FIG. 2 is a flow chart for processing a medical record, according to some implementations.

The ECP platform module 103 may include digital nurse module 104. Digital nurse module 104 includes a pre-processing module 106, model orchestration module 108, model execution module 110 and post-processing module 112. Digital Nurse module 104 may use AI to evaluate the medical record document or to recommend further specific types of analysis by modules discussed below. An example of the AI methodology applied by digital nurse module 104 is shown in FIG. 2, as discussed below. For example, each medical record may be labeled as medical records with appropriate patient-identifying information. Each medical record may also have identifying information that relates that medical record to a policy, e.g., one or more policy types. In some aspects of the invention, the policy may be a medical insurance policy, or a subset thereof relating to a single diagnosis or part or section of the body. For example, there may be a policy based on knee injuries, a policy based on cancer, or a policy based on a specific kind of cancer such as breast or lung cancer. In one aspect, a policy may be the document that provides the rules and guidelines for when a treatment of a particular type will be covered by, e.g., the insurer. This policy-type information can come in the form of a diagnosis code, a treatment code or a billing code, or it can be some other datum that identifies the policy under which this proposed medical treatment will be evaluated for reimbursement, and to which the medical record is relevant. Each medical record may have a specific number of pages with various data items including text, headers, outlines, fax transmission, images and other data associated with the medical record All data evaluated by, or created by, digital nurse module 104 may be stored in database 138 of data systems module 107.

Pre-processing module 106 processes each page of each medical record received by the gateway module 102 to de-skew image data and remove noise to produce processed pages of the medical record. In some embodiments, the pre-processing module 106 improves the accuracy of text extraction when an OCR model is applied to the medical record, because skewed images and noise can impede the work of the OCR by obscuring the text and making it more difficult to interpret. In some embodiments, the pre-processing module 106 uses an OpenCV library to read each page of the medical record as both an image file and a text file. In doing so, other extraneous information from each page of the medical record such as fax transmission information, e.g., in the form of headers or footers, is also removed. In some embodiments, the top and bottom of each page are trimmed to remove fax transmission messages. In other embodiments, fax transmission messages are automatically deleted upon recognizing fax transmission text via the OCR process. In some embodiments, each page is passed to a custom function that inspects the page to determine text orientation. For example, some faxed and transmitted pages are rotated by 90 or 180 degrees. Adjusting the orientation of text on a page-by-page basis can also be helpful to the medical professional who is reviewing the medical records after they are processed. Once the basic text orientation is determined, the page may then be de-skewed to correct any tilt brought on during fax transmission, photocopying, scanning, or the like. Further filters in the OpenCV library are used to remove grain, horizontal lines, and other noise from the page, which makes the resulting OCR more accurate.

Model orchestration module 108 extracts text from each page of the processed medical record that has text, using OCR. In doing so, all text as well as bounding boxes and confidence scores for each word are identified and extracted. The extracted text of each medical record is post-processed as well, using, for example, spell-checking to correct mistakes made in the OCR process. Model orchestration module 108 uses a rules-based approach to connect sentences into paragraphs, and to remove grammatical errors, textual abnormalities and non-standard punctuation that may have been introduced by the OCR process. Model orchestration module 108 may also use a spell-check feature to correct errors that may appear in the OCR process. In some embodiments, the spell-check feature may choose from among several words that are close in spelling to the word as recognized by the OCR. In some embodiments, this choice may be informed by frequency data for each word, that shows how often that word appears in, e.g., other medical records. In some embodiments, the spell check may choose its substitute word for a misspelled word, from a dictionary that may be specific to a relevant policy type corresponding to the medical record being reviewed. Accordingly, spell check may substitute different words for the same misspelled word, based on the policy at issue. Model execution module 110 trains one or more neural networks to perform further analysis of the medical record pages after they are de-skewed; noise may be reduced, and text may be recognized using OCR. For example, a multinomial classifier model using an LSTM neural network may be trained to analyze the extracted text for generating an appropriate classification label for each page of each medical record of the one or more medical records. A classification label may be used to identify common types of pages that may appear within a medical record, such as a set of lab results, an after-visit summary, an X-ray image, or other common parts of a medical record. In some embodiments, a corpus of historical medical records may be used to train the LSTM model. In some embodiments, the corpus may be thousands of historical medical records that have been manually classified into categories, by nurses or other professionals who reviewed them, for the purposes of training the LSTM model to apply the same category labels to other medical record pages that have a sufficient level of similarity to the categorized historical pages. In some embodiments, there are between 70 and 80 classification labels.

A single page of a medical record may contain a mixture of writing styles, tables, images, and lists. Accordingly, the LSTM model may be trained to classify the contents of each page based on the text extracted from the page as described in model orchestration module 108. Other similarities than text content may also be used to classify a page into a category based on its similarity to historical pages categorized the same way in the training corpus. Accurate categorization of different pages in a medical record may assist a professional, who is reviewing the entirety of the record, in navigating through the electronic record to find the types of pages within the record that are most relevant to the decision the review professional is tasked with making, e.g., whether the medical treatment should be covered.

In some embodiments, model execution module 110 may accurately apply classification labels to medical record pages containing, and/or consisting entirely of, images (e.g., member insurance cards, radiological imaging, blank pages that may be present in a fax transmission). The corpus of historical medical records as discussed with respect to classifying text documents based on similar text may also contain historical image documents that have been categorized. In some embodiments, of the 70 to 80 classification labels, between 10 and 20 of them are types of images. Multinomial classification may also include, for each page of each medical record with image data, training a CNN architecture model to accurately classify an image type present, based on similarities to the classified historical image documents in the training corpus. For example, if no header is present on the individual page of the medical record that contains an image, the multinomial classifier model may determine whether the LSTM model classifies the page as an image. Once the document is classified as an image, the CNN model may take over, using technology that may be categorized as "computer vision" to compare the image to similar images in the corpus and assign the image page a classification label. As such, the LSTM model and CNN model together can determine not only if an image is present, but also the type of image that is present. This level of specificity may be valuable in saving time for medical practitioners in reviewing clinical documentation and providing a decision, as text pages, image pages, and pages with mixed text and images may all be classified into known page types for easy sorting and review.

Model execution module 110 further includes training an NER model to recognize specific keywords of each medical record (e.g., when referenced in other contexts) using the extracted text for each page. For example, the NER model may be trained to recognize specific keywords as provider or medical policy-specific keywords in a document. Training the NER model may include using a spaCy NER pipeline for specifying English as a language of choice and suppressing other spaCy NLP pipeline components. Training the NER model may include recognizing medical entities specific to an individual medical policy and using the recognized medical entities, which may include the medical policy itself, to develop a policy-specific dictionary. This dictionary can be used when analyzing other pages of the same medical record or other records relating to the same policy or patient, so that these terms can be highlighted or otherwise emphasized to the reader when they appear.

The extracted text from medical records specific to the individual policy of interest may be used as the training and testing corpus for the NER model. Accordingly, in some embodiments, there may be different NER models for different policies, each using a dictionary of keyword terms derived from the policy. When medical documents are reviewed to determine medical necessity to inform a decision on whether to cover a procedure or treatment, keywords and key phrases that may be important for one kind of treatment (e.g., a knee surgery) may not be important for another kind of treatment (e.g., an appendectomy). Accordingly, NER models for different kinds of policies can be used, so that keywords important to the relevant policy are located and highlighted, and keywords that might be relevant to other policies but are not relevant to the policy at hand are not highlighted. The NER model may be trained using the training data, and test-set metrics are logged to ensure that the trained model has learned to accurately identify the policy-specific entities while also ensuring that the model generalizes well to previously unseen text. The system may in some embodiments use diagnosis codes or billing codes associated with a medical record to determine which relevant policy's NER model should be used when the system analyzes and displays that record.

The system 100 may also include an OCP module 114, which may be run on a Red Hat OpenShift Container Platform. OCP module 114 may include eSearch API 116, which allows for retrieval of specific clinical guidelines. eSearch API 116 may also include the fetch policy submodule 118, which passes information about the requested clinical guideline. OCP module 114 may also include esearch module 122, which accepts the clinical guideline response of eSearch API 116.

OCP module 114 may also include a content management API 119, which, in some embodiments, may be a FileNet API, and which allows for communication with a content management system in order to retrieve a medical record via Disease Correlation Network (DCN). In some embodiments, the content management system may be FileNet. Content management API 119 may also include a Get DCN submodule 120, which retrieves the medical record as a base64-encoded file. OCP module 114 may also include a content management module 124, which accepts the base64-encoded DCN response of content management API 119.

The system 100 may also include OCP module 126, which may include OCR API module 128 to perform the OCR pipeline on the transmitted medical records. In one embodiment, OCR API module 128 may be a Tesseract OCR API module. OCR API module 128 may also include ingest DCN and File Location submodule 130, which takes as its input either a file location or a medical record (DCN) file. OCR API module 128 may also include Convert base64 to Tiff submodule 132, which converts the DCN in base64 format to the Tiff image format. OCR API module 128 may also include the run OCR submodule 134, which performs the character recognition on the Tiff image from submodule 132. OCR API module 128 may also include the send response submodule 136, which transmits the extracted text from submodule 134.

Referring to FIG. 2, there is shown an exemplary flow chart 200 for digitizing clinical documentation using an AI methodology, according to some embodiments. Exemplary medical record 300, of FIG. 3, shows an exemplary page of a medical record, augmented by the steps of the method as shown in the flow chart of FIG. 2. Exemplar medical record 300 includes text terms indicative of clinical documentation, including office visit date, progress notes, chief complaint, etc. The process summarized in FIG. 2 illustrates the model used to evaluate various portions of a medical record, e.g., medical record 300 as shown in FIG. 3. In one embodiment, the process 200 uses the modules as described in FIG. 1.

As discussed with reference to FIG. 1, three primary modules are trained using different corpora of data. An LSTM module may be trained 201, using a corpus of thousands of previously manually classified types of medical record pages containing text. The LSTM module may be trained to recognize similarities in text characteristics categories of medical record pages that contain text. A CNN module may be trained 202, using a corpus of previously manually classified types of medical record pages containing images, in order to use computer vision to recognize similarities in image data. The LSTM and the CNN modules are trained to generate a classification label for the medical record page, on the basis of the similarity of the text and images to the previously labeled historical medical records. Third, multiple NERs are trained 203. As discussed above, NERs are trained using policy-specific reference material, which may include the policy itself, in order to assemble a specific dictionary of keywords and key phrases that are relevant to the specific policy, which may relate to a specific bodily system, diagnosis, or treatment.

After the LSTM, CNN and NER modules are trained, the system is ready to digitize and augment a specific medical record, which review may occur page by page. The system receives (204) the medical record, and a policy type corresponding to a policy under which the medical record will be reviewed, e.g., for proof of medical necessity of a proposed treatment. In some embodiments, the policy type may be indicated by a billing code or a diagnostic code. A page of the medical record may then be de-skewed (205) and noise may be removed (206) to improve the environment for OCR. In one embodiment, text mining may be used to filter noise. For example, various spurious text or notations may be present on the medical record that are removed using text mining. As discussed above with reference to pre-processing module 106 of FIG. 1, examples of text mining to filter noise may include removing fax header information, removing horizontal or vertical line artifacts that may be present from scanning, photocopying, or faxing a document, and removing grain or other noise in poor copies that may erroneously register as stray characters and pollute the OCR results.

OCR may then be performed (207), which generates extracted text. As a part of the OCR process, the spell check as discussed above may be performed, wherein the spell check may correct spelling in different ways based on the NER model for the policy at issue. For example, as explained in model orchestration module 108 of FIG. 1, a rules-based approach may be used to extract text, connect sentences into paragraphs, remove grammatical errors, remove textual abnormalities and remove non-standard punctuation. In some embodiments, the rules-based approach may be used to determine where paragraph breaks occur, based on the language used in the different lines of text on a page. It may be useful for the LSTM module to know about paragraph breaks, as that may assist it in classifying the document.

The OCR process also includes a check for grammatical errors. In some embodiments, rules-based text analysis may be used to remove grammatical errors that may result from erroneous OCR recognition. Correcting those errors of grammar may assist the LSTM analysis in having more accurate text to analyze when classifying the page. Correction of those errors of grammar may also assist the NER analysis in locating policy-specific keywords. Similarly, the rules-based approach may be used to correct non-standard punctuation. For example, the OCR module may have erroneously recorded a capital "I" or a lowercase "1" as, instead, an exclamation point (!). Rules-based analysis would recognize that an exclamation point would be inappropriate in that context, and then correct the character to either an "1" or an "I," depending on the context of the rest of the word in which it appears. This allows the OCR to be more accurate. Without it, keywords might be missed and similarities to historical records may be missed when classifying the page type.

As discussed with reference to model execution module 110 of FIG. 1, deep learning neural networks and NLP classification are used to accurately classify page types. After the OCR process, the system then checks (208) if text is present in the page at issue. If so, the model recognizes (209) if headers are present in the medical record, in accordance with pre-processing module 106 in FIG. 1. For example, as shown in exemplary medical record 300 of FIG. 3, the AI detects that the phrase "Progress Notes" and "Past Medical History" are headers, based on the context of the OCR text. The context may include the font, or the relative font size, or the surrounding lines or boxes that highlight the importance of the certain text relative to other text. In some embodiments, header detection may be accomplished using OpenCV to identify bolded text or larger header areas. In some embodiments, headers may be highlighted when displayed, or may be given priority in using the LSTM analysis of model orchestration module 108 to classify the page of the medical record.

In some embodiments, a combination LSTM/CNN architecture may classify the individual pages in a medical record. The LSTM module, as discussed with reference to FIG. 1, may evaluate (210) text and classify pages based on the text that appears, and to identify when images appear. If the text has been analyzed, or if there is no text, the system, in some embodiments model execution module 110 of FIG. 1, then determines (211) whether images are present. The CNN module may compare (212) images to historical exemplar images in order to classify them. In some embodiments, the LSTM/CNN architecture may be trained using the content of the page based on the extracted text, identified headings, and known terms, to classify the page. Page classifications may permit a review system to produce an automatically generated table of contents or other indexing applications, of the various different kinds of pages within the medical record, which permits a more streamlined review. In some embodiments, the LSTM may classify the page as an image. When this occurs, the CNN model may be trained in some embodiments to classify what type of image is present. Accordingly, this combination of LSTM and CNN permits pages with text, and pages with images, to both be classified in the same medical record, in such a way as to allow the entire medical record to be navigated by page type.

Policy-relevant information may be detected (214), as discussed with reference to model execution module 110 of FIG. 1, recognizing that a specified keyword within the processed page may occur, using an NER model. In some embodiments, the NER model may be trained to recognize medical entities specific to an individual medical policy. In some embodiments, a keyword dictionary of relevant entities may be used, to train the NER model to look for these known terms within the medical record, so that they can be highlighted, indexed, or otherwise easily found by a person reviewing the medical record, and so that terms that may not be relevant are not highlighted, even if the same terms might be relevant and highlighted in a different medical record being reviewed in the context of a different policy. In some embodiments, test-set metrics may be logged to ensure that the trained NER model has learned to accurately identify policy-specific entities and to ensure that the model may be applied more generally to locate policy-specific entities in previously unseen text. As shown in sample medical record 300, the date of an office visit to the doctor is identified as policy-relevant information by context-based named entity recognition.

Further policy-relevant terms may be identified, using a question and answer system. In some embodiments, a policy criteria checklist may be used. As shown, the result of the NER identifying (214) policy-specific keywords to medical record 300 was the identification of the terms "mom," "breast cancer," "biopsies," "breast tissue," and "mammogram" as policy-relevant information. The family history of the patient, namely "Mom dx of breast cancer at 36, died at age 52," is also identified as policy-relevant information.

Turning now to FIG. 3, an exemplary page of a medical record 300 including text terms indicative of clinical documentation, including office visit date, progress notes, chief complaint, etc., sample medical record 300 shows some of the ways in which the medical record can be presented to the user in a user interface or user experience where the information learned and created by the system 100 can assist a reviewer in his or her review. Headers and policy-relevant information can be highlighted or presented in different colors so they stand out to the review while reviewing the medical record within the user experience. As shown, model orchestration module 108 has identified (209) phrases such as "Progress Notes," "Chief Complaint," "Family History," and "Past Medical History" to be headers, and as such has highlighted them in an outlined box without fill.

As shown, the result of the NER analysis of the extracted text using a policy-specific set of keywords, in accordance with model execution module 110 and step 214 of FIG. 2, to medical record 300, was the identification of the terms "mom," "breast cancer," "biopsies," "breast tissue," and "mammogram" as policy-relevant information. The family history of the patient, namely "Mom dx of breast cancer at 36, died at age 52," is also identified as policy-relevant information by the NER module in accordance with step 214 of FIG. 2. These terms are shown highlighted in a box with fill, which distinguishes them from headers. These terms are relevant to a policy relating to a breast cancer diagnosis. If this page appeared in a record submitted in support of a proposal for a knee replacement surgery, these terms would be evaluated by a different policy-specific NER module and might not be highlighted.

The foregoing description, for the purpose of explanation, has been described with reference to specific implementations. However, the illustrative discussions above are not intended to be exhaustive or to limit the scope of the claims to the precise forms disclosed. Many modifications and variations are possible in view of the above teachings. The implementations are chosen in order to best explain the principles underlying the claims and their practical applications, to thereby enable others skilled in the art to best use the implementations with various modifications as are suited to the particular uses contemplated.

What is claimed is:

1. A computer-implemented method for digitizing clinical documents, the method comprising:

receiving a clinical document and a policy type relating to the clinical document, the clinical document comprising at least one page;

generating a processed page, by detecting whether the page includes an orientation skew;

de-skewing the page;

detecting whether the page includes noise; and removing noise from the page;

generating extracted text from the processed page using optical character recognition (OCR);

analyzing the extracted text to generate a classification label for the page using a multinomial classifier model comprising a long short-term memory (LSTM) neural network, wherein the multinomial classifier model has been trained to recognize different classes of page, based on similarities to a corpus of historical pages that have been previously classified;

recognizing a specified keyword within the extracted text, using a named entity recognition model (NER), wherein the NER is trained using policy data relating to a policy having the policy type, and wherein the specified keyword is identified as relating to the policy type; and displaying a visual representation of the clinical document on a display, wherein the visual representation comprises a visual indicator of the presence of the specified keyword on the page, and a visual indicator of the classification label.

2. The method of claim 1, further comprising correcting grammatical and textual abnormalities in the extracted text using a rules-based approach.

3. The method of claim 1, further comprising classifying an image on the page, using a convolutional neural network (CNN) architecture, wherein the CNN architecture is trained based on similarities to a corpus of historical pages that have been previously classified as comprising an image.

4. The method of claim 3, further comprising analyzing an image and text on the processed page to classify the processed page, using the CNN architecture to classify the image and the LSTM to classify the text.

5. The method of claim 1, wherein the de-skewing step and the removing noise step are performed using an OpenCV library.

6. The method of claim 1, further comprising the step of correcting a spelling of a word in the extracted text by choosing a corrected word, based at least in part on the frequency with which the corrected word appears in at least one of the corpus of historical pages and the policy data.

7. The method of claim 1, further comprising analyzing the extracted text to determine a location of a header, wherein the multinomial classifier model uses the location of the header to generate the classification label.

8. The method of claim 1, wherein the multinomial classifier model has been trained to recognize different classes of page based on the policy type in addition to the similarities to the corpus of historical pages that have been previously classified.

9. The method of claim 1, wherein the NER is trained using medical policy-specific keywords.

10. A non-transitory computer-readable storage medium storing one or more programs for execution by one or more processors of an electronic device, the one or more programs comprising instructions for:

receiving a clinical document and a policy type relating to the clinical document, the clinical document comprising at least one page;

generating a processed page, by detecting whether the page includes an orientation skew;

de-skewing the page;

detecting whether the page includes noise; and removing noise from the page;

generating extracted text from the processed page using optical character recognition (OCR);

analyzing the extracted text to generate a classification label for the page using a multinomial classifier model comprising a long short-term memory (LSTM) neural network, wherein the multinomial classifier model has been trained to recognize different classes of page, based on similarities to a corpus of historical pages that have been previously classified;

recognizing a specified keyword within the extracted text, using a named entity recognition model (NER), wherein the NER is trained using policy data relating to a policy having the policy type, and wherein the specified keyword is identified as relating to the policy type; and displaying a visual representation of the clinical document on a display, wherein the visual representation comprises a visual indicator of the presence of the specified keyword on the page and a visual indicator of the classification label.

11. The medium of claim 10, further comprising instructions for correcting grammatical and textual abnormalities in the extracted text using a rules-based approach.

12. The medium of claim 10, further comprising instructions for classifying an image on the page, using a convolutional neural network (CNN) architecture, wherein the CNN architecture is trained based on similarities to a corpus of historical pages that have been previously classified as comprising an image.

13. The medium of claim 12, further comprising instructions for analyzing an image and text on the processed page to classify the processed page, using the CNN architecture to classify the image and the LSTM to classify the text.

14. The medium of claim 10, further comprising instructions for correcting a spelling of a word in the extracted text by choosing a corrected word, based at least in part on the frequency with which the corrected word appears in at least one of the corpus of historical pages and the policy data.

15. The medium of claim 10, further comprising instructions for analyzing the extracted text to determine a location of a header, wherein the multinomial classifier model uses the location of the header to generate the classification label.

16. A system for automating clinical documentation review, the system comprising: one or more processors;

memory; and one or more programs stored in the memory, wherein the one or more programs are configured for execution by the one or more processors and include instructions for:

receiving a clinical document and a policy type relating to the clinical document, the clinical document comprising at least one page;

generating a processed page, by detecting whether the page includes an orientation skew;

de-skewing the page;

detecting whether the page includes noise; and removing noise from the page;

generating extracted text from the processed page using optical character recognition (OCR);

analyzing the extracted text to generate a classification label for the page using a multinomial classifier model comprising a long short-term memory (LSTM) neural network, wherein the multinomial classifier model has been trained to recognize different classes of page, based on similarities to a corpus of historical pages that have been previously classified;

recognizing a specified keyword within the extracted text, using a named entity recognition model (NER), wherein the NER is trained using policy data relating to a policy having the policy type, and wherein the specified keyword is identified as relating to the policy type; and displaying a visual representation of the clinical document on a display, wherein the visual representation comprises a visual indicator of the presence of the specified keyword on the page, and a visual indicator of the classification label.

17. The system of claim 16, the one or more programs further comprising instructions for correcting grammatical and textual abnormalities in the extracted text using a rules-based approach.

18. The system of claim 16, the one or more programs further comprising instructions for classifying an image on the page, using a convolutional neural network (CNN) architecture, wherein the CNN architecture is trained based on similarities to a corpus of historical pages that have been previously classified as comprising an image.

19. The system of claim 18, the one or more programs further comprising instructions for analyzing an image and text on the processed page to classify the processed page, using the CNN architecture to classify the image and the LSTM to classify the text.

20. The system of claim 16, the one or more programs further comprising at least one of: (i) instructions for correcting a spelling of a word in the extracted text by choosing a corrected word, based at least in part on the frequency with which the corrected word appears in at least one of the corpus of historical pages and the policy data; or (ii) instructions for analyzing the extracted text to determine a location of a header, wherein the multinomial classifier model uses the location of the header to generate the classification label.

\* \* \* \* \*